July 28, 1959     D. T. AYERS, JR     2,896,586
FLUID PRESSURE OPERATED MOTOR
Filed March 9, 1956     4 Sheets-Sheet 4
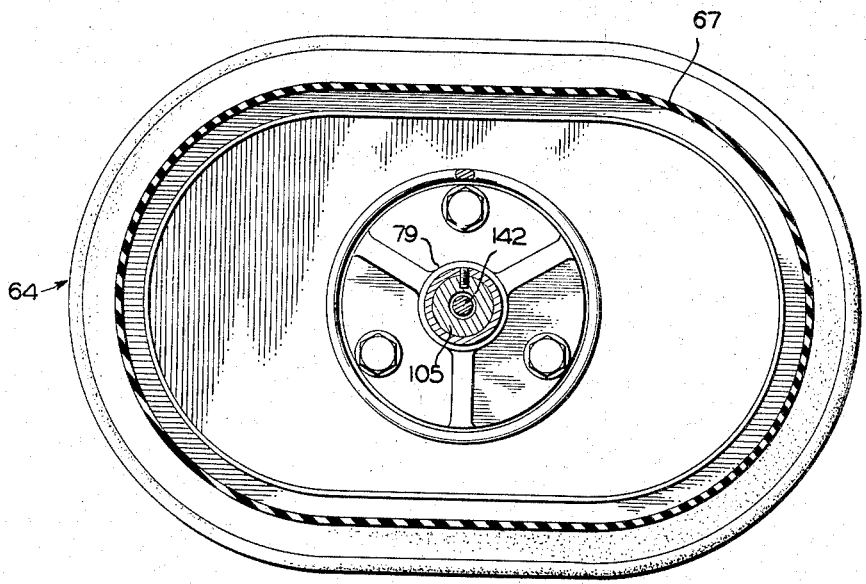
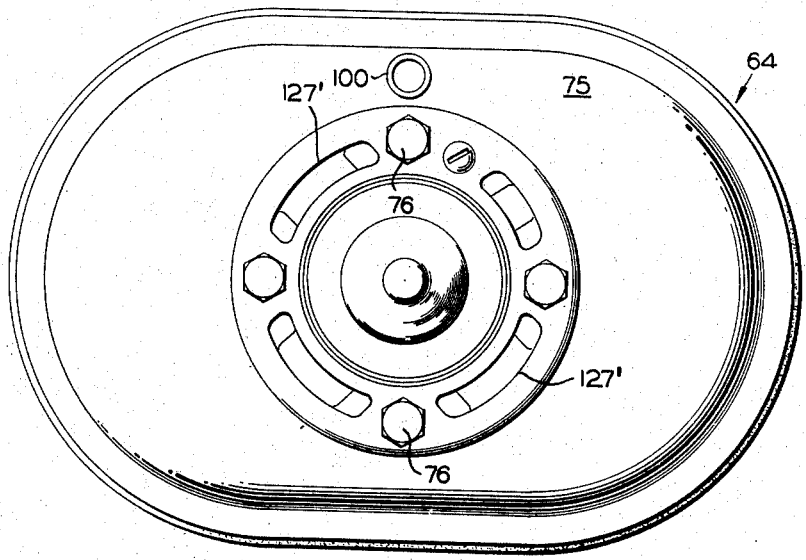
INVENTOR
DAVID T. AYERS JR.
BY
ATTORNEY United States Patent Office 2,896,586
Patented July 28, 1959

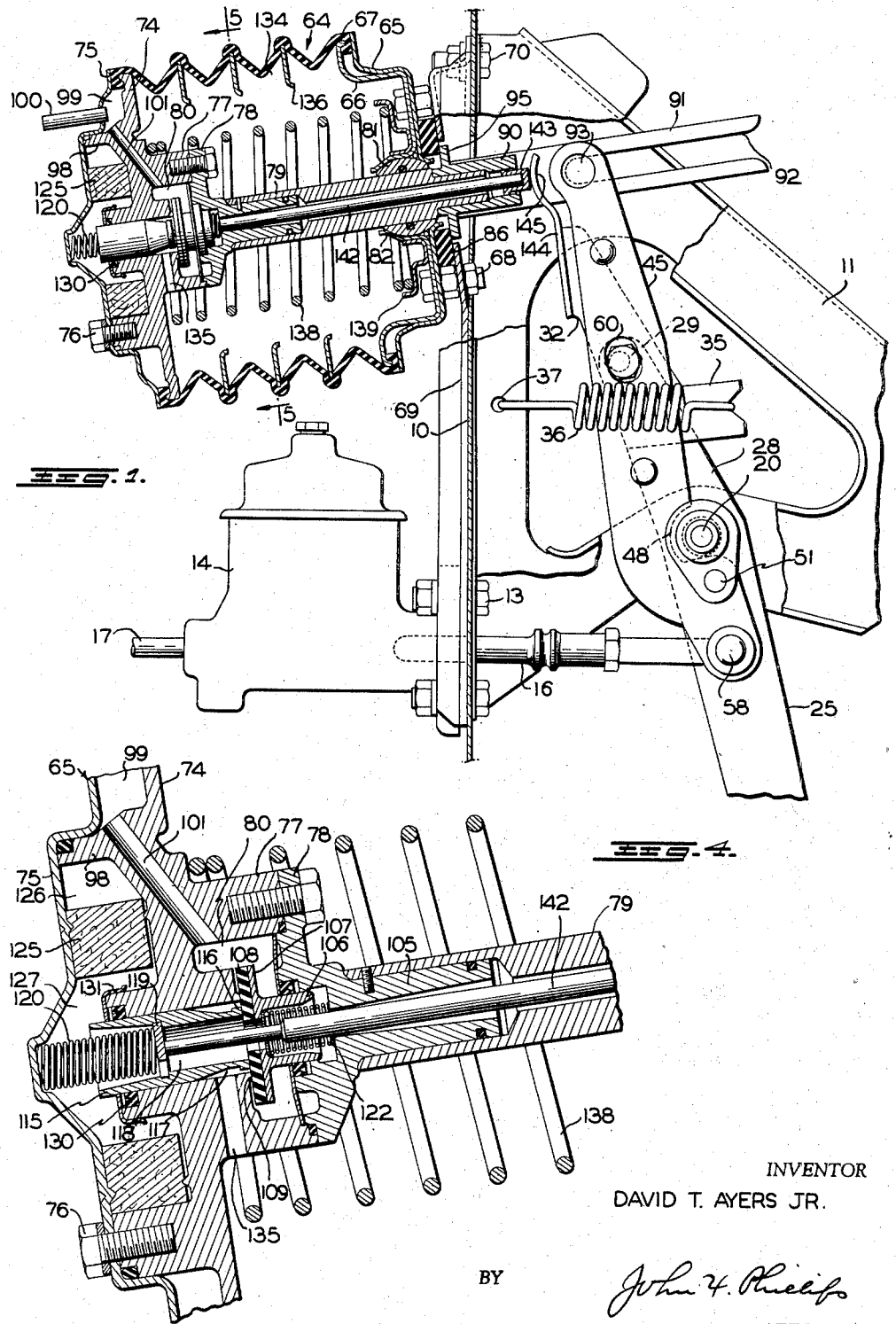

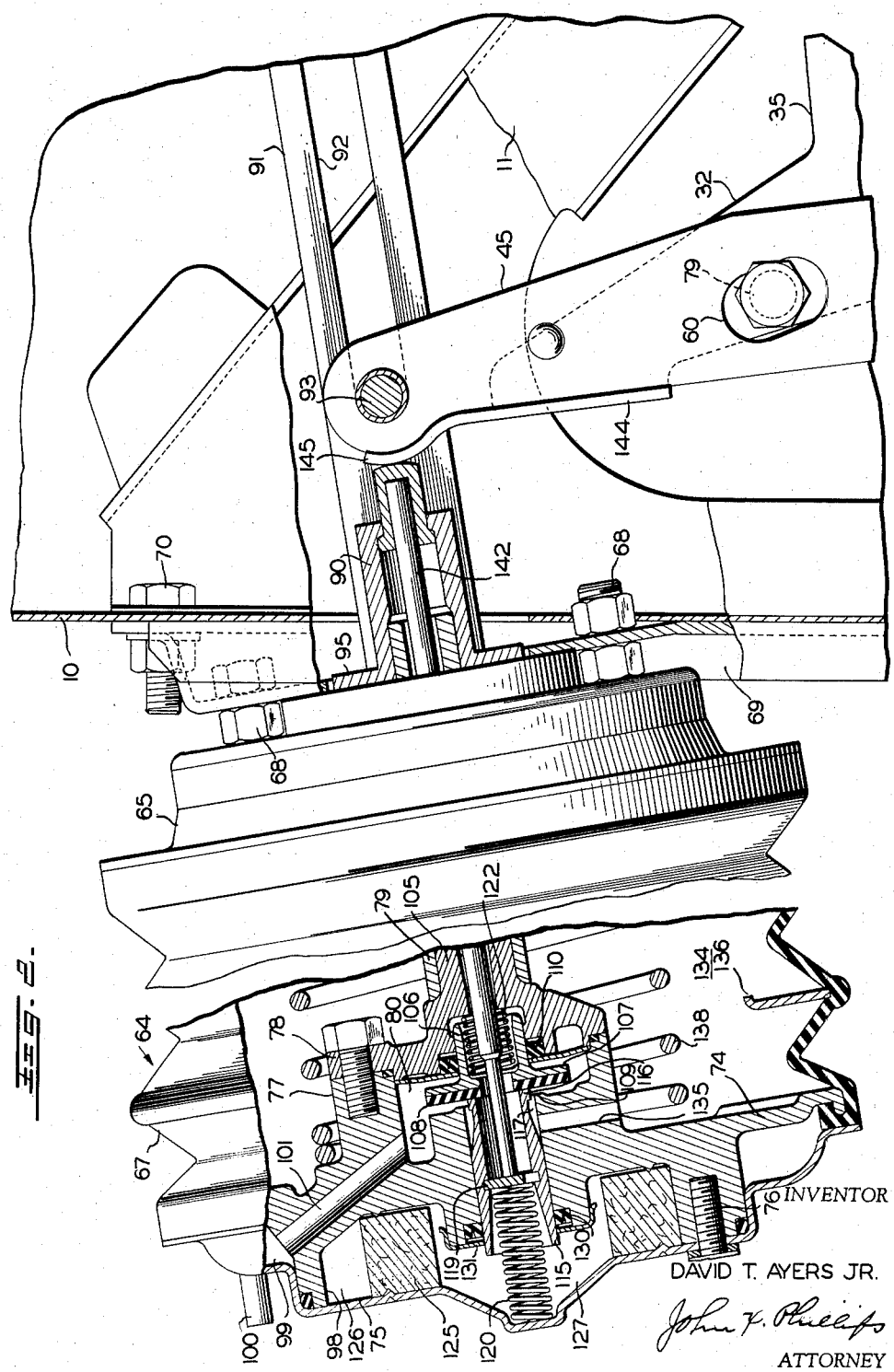

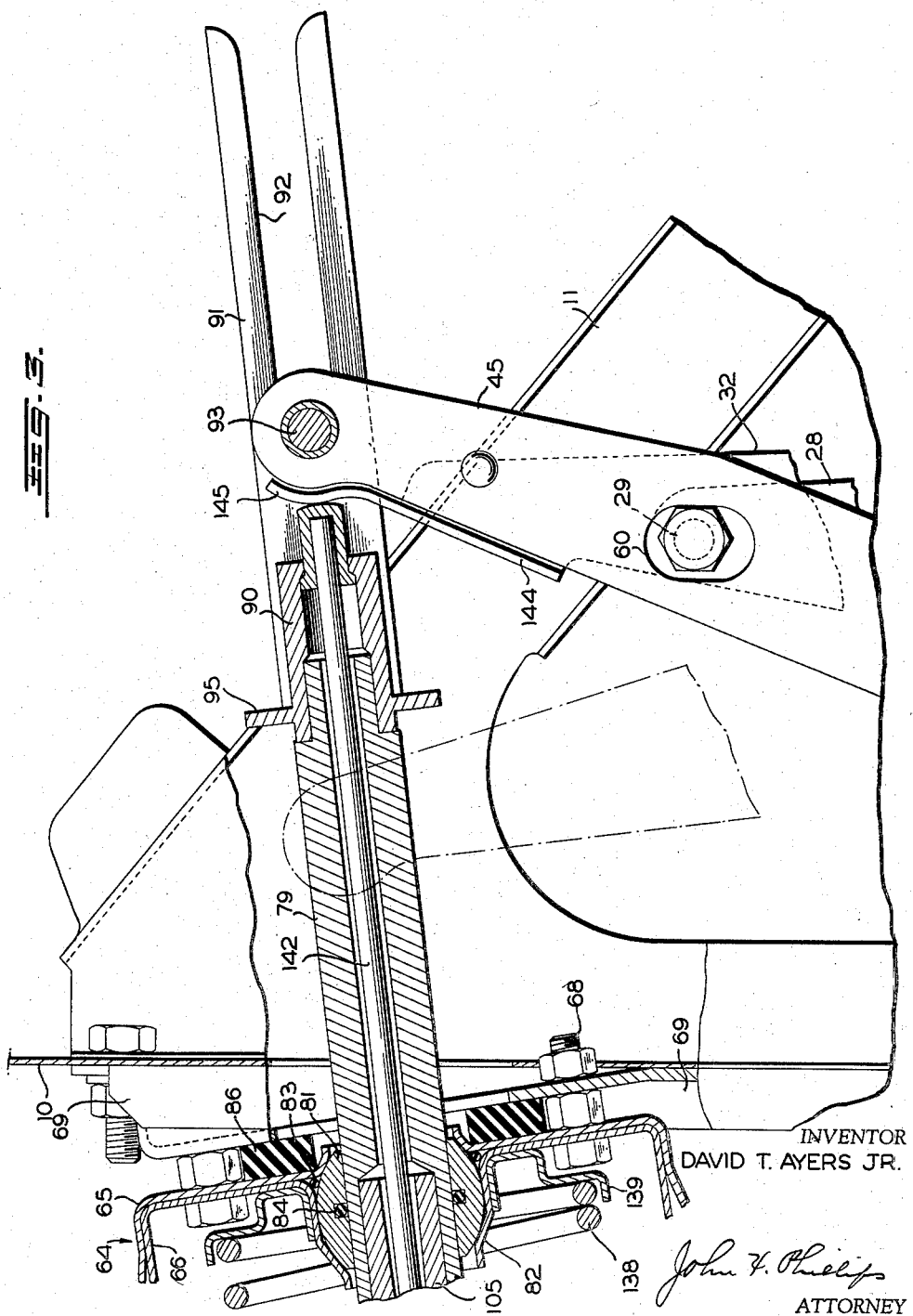

2,896,586

FLUID PRESSURE OPERATED MOTOR

David T. Ayers, Jr., Birmingham, Mich., assignor to Kelsey-Hayes Company, a corporation of Delaware Application March 9, 1956, Serial No. 570,516

15 Claims. (Cl. 121—41)

This invention relates to a fluid pressure operated motor, and more particularly to a motor especially adapted for use as a source of power in a booster brake mechanism.

This application is an improvement over the motor structure disclosed and claimed in my copending application Serial No. 502,996, filed April 21, 1955, now Patent 2,791,203, issued May 7, 1957.

In my copending application referred to, I have disclosed a fluid pressure motor particularly adapted for use with a vehicle brake pedal of the hanging type, the lever mechanism including the pedal lever being pivotally mounted intermediate its ends and the motor being arranged to apply force to the lever mechanism above the pivotal mounting thereof. Such an arrangement of parts is highly practicable by reason of the fact that it facilitates the installation of the motor at a position in the vehicle wherein space is available. Moreover, it hides from view in the driver's compartment the motor and the means connected between the motor and the lever mechanism.

The motor of the copending application is in itself novel in that it provides, contrary to common practice, a control valve for the motor which is biased to a motor-energizing position, the valve normally being held against its biasing means in a motor de-energizing position by a stronger biasing means associated with the lever mechanism. The prior construction has been found wholly satisfactory in practical use except for the fact that it employs a sleeve valve which, in common with similar devices of this character, is subject to some leakage during the operation of the booster motor.

An important object of the present invention is to provide a motor particularly intended to be mounted in the same manner as the motor of the copending application referred to, but wherein the valving is of a novel poppet type which prevents the inevitable leakage around a sleeve valve.

A further object is to provide such a motor wherein a single poppet valve is employed in conjunction with two valve seats, the valve being urged into engagement with one seat by biasing means and the other seat being biased in the opposite direction to tend to hold the valve away from said one seat by a stronger biasing means whereby, when the pedal lever is operated, such stronger biasing means comes into operation to render the valve operative for energizing the motor.

A further object is to provide such a motor construction wherein the parts are particularly simple in construction and wherein the parts of the valve mechanism, as well as other parts of the motor, may be quickly and easily assembled.

A further object is to provide such a motor structure wherein the weaker of the two biasing means referred to is assisted by a stronger biasing means to normally overcome the biasing means associated with the second valve seat referred to above, whereby the latter biasing means is normally overcome by the sum of the forces of the weaker biasing means, and a stronger biasing means associated with the lever mechanism.

Other objects and advantages of the invention will become apparent during the course of the following description.

In the drawings I have shown one embodiment of the invention. In this showing:

Figure 1 is an elevation of the motor and associated parts of the brake mechanism, parts being broken away and the motor being largely shown in section, the parts being shown in their normal off positions;

Figure 2 is an enlarged fragmentary view showing the motor and the connection thereof with the operating and control lever mechanism, parts being broken away and parts being shown in elevation, the parts being shown in their motor-energizing positions;

Figure 3 is a similar view showing the rear end of the motor and the associated parts, the latter being shown in motor-energized position in solid lines;

Figure 4 is an enlarged fragmentary sectional view of portions of the control valve end of the motor with the valve parts shown in lap position;

Figure 5 is a section on line 5—5 of Figure 1; and

Figure 6 is a forward end elevation of the motor.

The motor is shown and described in conjunction with portions of a vehicle brake mechanism in the interest of a clearer understanding of the invention. The present application, however, is directed particularly to the novel features of the motor construction.

Referring to Figures 1, 2 and 3, the fire wall of a motor vehicle is indicated by the numeral 10. A substantially triangular bracket 11 is secured to the fire wall and projects rearwardly thereof. The lower portion of the bracket is secured to the fire wall 10 by bolts 13 serving also to secure to the fire wall forwardly thereof a conventional master cylinder 14 operable by a push rod 16 to displace fluid through a line 17 for distribution to the brake cylinders of the vehicle.

The bracket 11 supports suitable levers, etc. for controlling both the motor and the master cylinder. Referring to Figure 1, a shaft 20 is supported by the bracket, and this shaft serves to support a pedal lever 25. The lower end of the pedal lever carries a conventional pedal pad (not shown). Above the shaft 20, the pedal lever has an operating arm 28 through which projects a bolt 29 carried by such operating arm. This bolt serves to assist in maintaining in position with respect thereto a bracket 32 having other fastening means (not shown) cooperating with the bolt 29 to positively fix the bracket 32 relative to the pedal lever. The lower end of the bracket 32 is provided with a projection 35, and a return spring 36 (Figure 1) is connected at one end to the projection 35 and has its other end anchored as at 37 to the bracket 11.

A reaction or power lever 45 is arranged adjacent the pedal lever and is arched as at 48 (Figure 1) to pass around the shaft 20 and the elements associated therewith not disclosed in or forming a part of the present invention. The lever 45 is pivotally connected to the pedal lever as at 51. At its lower extremity, the lever 45 is pivoted as at 58 to the rearwardly projecting end of the push rod 16. The reaction lever 45 is slotted as at 60 to receive the bolt 29, the slot 60 providing lost motion between the bolt 29 and the lever 45.

The lever mechanism used in conjunction with the apparatus has only been generally described and is not shown in detail since it forms per se no part of the present invention. Such lever mechanism is disclosed and claimed in my copending application Serial No. 439,674, filed June 28, 1954, now Patent No. 2,805,550, granted September 10, 1957.

The motor forming the principal subject matter of the present invention is indicated as a whole by the numeral 64. This motor is of the air-suspended bellows type and comprises a rear stationary head 65 provided therein with a clamping ring 66 for clamping to the stationary head a bellows 67. The stationary head is secured by bolts 68 to a bracket member 69 the lower end of which carries the master cylinder 14 and is fixed to the fire wall by the bolts 13. The upper end of the bracket 69 is secured by bolts 70 to the fire wall 10, and these bolts serve also to secure in position the upper portion of the triangular bracket 11.

The rear end of the bellows 67 is clamped between a movable preferably die-cast head 74 and a cap 75 arranged thereover and fixed to the movable head by screws 76. The head 74 is provided with a rearwardly extending sleeve portion 77 cooperating with a flange 78 carried by a piston rod 79 to form a chamber 80. The piston rod 79 projects through a bearing 81 mounted to rock in a socket 82 formed of cooperating flanges carried by the head 65 and clamping plate 66. To provide for such rocking movement, the outer surface of the bearing 81 is spherical, as shown. This bearing has its outer surface sealed relative to the members 65 and 66 as at 83 (Figure 3), and the inner surface of the bearing is sealed relative to the piston rod 79 by a suitable seal such as an O-ring 84. While the head 65 is fixed in position, it is preferred that it be clamped relative to the bracket 69 with an interposed deformable cushion 86 to prevent any possible rattling of the parts. The cushion 86 serves an additional function referred to below.

A sleeve 90 is recessed at its forward end to receive the reduced rear end of the piston rod 79 and is provided with preferably integral parallel spaced arms 91 provided with alined slots 92 receiving a pin 93 carried by the upper end of the power lever 45. The pin 93 is normally arranged at the forward or inner ends of the slots 92 (Figure 1), and the spring 36 transmits force to the bracket 32, and to the lever 45 through the pin 29, and accordingly the pin 93 maintains the motor parts in normal position. Movement of the parts to such position is limited by engagement between a flange 95, carried by the sleeve 90, and the cushion 86, as shown in Figure 1.

The head 74 radially inwardly of its outer extremity carries a forwardly extending flange 98 seating against the cap 75. The members 74, 75 and 98 define therebetween a vacuum chamber 99 communicating through a tubular member 100 with a suitable source of vacuum. The vacuum chamber 99 communicates through a duct 101 with the chamber 80. Accordingly, it will be apparent that vacuum is always present in this chamber.

The piston rod 79 may be made of a single piece carrying as an integral part thereof the flange 78, or, as shown, this flange may be carried by a separate sleeve portion 105 fitted into the forward end of the main portion of the piston rod. The sleeve portion 105 slidably supports a valve sleeve 106 (Figures 2 and 4) having a flange 107 at its forward end to which is connected a resilient valve 108. This valve normally engages a seat 109 carried by the head 74. The valve sleeve 106 is mounted to slide in a suitable seal 110 in the sleeve member 105.

The head 74 is provided with an axial opening slidably receiving a sleeve 115 provided at its forward end with a seat 116 engageable with, but normally out of contact with, the valve 108. Around the forward end of the sleeve 115 is provided a space 117 forming a control chamber. This space is normally cut off from the chamber 80 when the parts are in the normal positions shown in Figure 1. The space 117, accordingly, normally communicates with the bore 118 of the sleeve 115.

An apertured spring seat 119 is seated in the sleeve 115. A biasing spring 120 engages at one end against the seat 119 and at its other end against the cap 75.

The spring 120 accordingly always exerts a biasing force on the sleeve 115 toward the right in Figure 4. Another biasing spring 122, weaker than the spring 120, biases the valve 108 toward the valve seat 109. When the parts are released for operation in the manner described below, therefore, the spring 120 overcomes the spring 122 to engage the valve seat 116 with the valve 108 and move the latter away from the valve seat 109.

Inwardly of the flange 98, the cap 75 is spaced from the head 74 and such space receives an annular air cleaner 125 which divides such space to form outer and inner chambers 126 and 127. The latter space communicates with the valve bore 118 through the aperture in the spring seat 119 (Figure 4). The chamber 126 communicates with the atmosphere through ports 127' (Figure 6). In connection with Figures 5 and 6, it will be noted that the motor as a whole, including the bellows 67, is elongated horizontally and the purpose of this is to provide the motor with greater capacity for a given vertical height. However, the central portion of the cap 75 may be circular, as clearly shown in Figure 6.

In order to eliminate leakage from the air chamber 127 around the sleeve 115, the latter element is surrounded by a seal 130 maintained in position by a cap 131.

The bellows 67 and the two motor heads define therebetween a pressure chamber 134 in fixed communication with the space 117 (Figure 4) through a passage 135. Air is normally present in this chamber, and the chamber is connected to vacuum in the manner described when the motor is operated. In order to prevent collapsing of the bellows when the chamber 134 is connected to vacuum, subtending flanges 136 are arranged in successive convolutions of the bellows, as shown particularly in Figure 1.

While the springs 36, 120 and 122 cooperate to control the valve mechanism, it is preferred that the motor be provided with a return spring for moving the head 74 to its normal off position when the motor is de-energized. To this end, a coiled compression spring 138 is arranged in the motor and has one end engaging the head 74. The other end of this spring engages a spring seat 139 preferably welded to the clamping ring 66.

The piston rod 79 is tubular. Through such member extends a valve control rod 142. The forward end of the rod 142 extends through the apertured center of the valve 108 and through the bore 118 into contact with the spring seat 119. The rear end of the rod 142 extends through the sleeve 90 and is provided with an operating button 143 preferably formed of nylon. The bracket 32 is provided at its upper extremity with a laterally extending finger 144 having a curved upper end 145 engageable with the button 143.

*Operation*

The parts normally occupy the positions shown in Figure 1. The head 74 is urged to its normal position and is limited in its movement to such position by engagement of the flange 95 with the cushion 86. The spring 122 (Figure 4) maintains the valve 108 in engagement with the seat 109. The seat 116, urged toward the valve 108, will be held out of engagement therewith since it will be overcome by the tension of the spring 36 (Figure 1) acting on the sleeve 115 through the rod 142, rod-engaging element 145, lever end 28, pin 29, and projection 35.

In order to operate the mechanism to displace fluid from the master cylinder 14, the operator will depress the brake pedal 25, thus causing it to turn on the pin 20 in a clockwise direction. The pin 29 moves freely of the lever 45 in the initial operation, this pin normally engaging the left-hand side of the slot 60 as viewed in Figure 1.

Initial movement of the pedal lever 25 takes place against the tension of the spring 36, and little force is required to perform this operation. The rod engaging member 145 releases pressure on the rod 142, this rod thereupon moving toward the right in Figures 1 and 2 whereby the spring 120 becomes free to move the sleeve 115. Upon very slight movement of the brake pedal, therefore, the valve seat 116 will be moved into engagement with the valve 108, and the parts will assume the lap position shown in Figure 4.

Whereas in the normal positions of the parts atmospheric pressure will be present in the motor chamber 134 through port 135 and space 117, this communication will be cut off when the valve elements are in the lap position referred to. Further movement of the brake pedal permits movement of the rod 142 to the right under the influence of the spring 120, which is stronger than the spring 122. Under such conditions the valve parts will assume the motor energizing positions shown in Figure 2; the valve seat 116 moving the valve 108 away from the valve seat 109. The space 117, which is always in communication with the motor chamber 134 through passage 135, will now communicate with the vacuum chamber 80, and air will be exhausted from the motor chamber 134. The motor head 74 will now start to move to the right in Figures 1–4, inclusive, and the inner ends of the slots 92, engaging the pin 93, will rock the power lever 45 about its pivot 51. Turning movement of the power lever will be clockwise, and accordingly force will be applied to the left through pin 58 to the push rod 16, connected to the master cylinder piston (not shown). Since such force is applied to the left to the push rod, there will be a reaction to the right against the pin 58, and such reaction is transmitted to the pivot pin 51 and thence to the pedal lever 25 by which the pin 51 is carried. Foot operation of the pedal 25, turning the pedal lever about the pivot 20, takes up this reaction through pin 51 to assist in applying the master cylinder operating force. Thus the operator performs part of the work in applying the brakes and feels a reaction proportionate to the degree of brake application. The lever mechanism per se forms no part of the present invention, but is described and claimed in pending application Serial No. 439,674, referred to above.

The degree of energization of the motor, or expressed in a different way, the movement of the head 74 toward the right in Figures 1–4, inclusive, will depend upon the distance of movement of the brake pedal. If the brakes are partially applied and movement of the pedal is arrested, movement of the rod 142 also will be arrested and very slight additional movement of the head 74 will move the valve seat 116 to the lap position shown in Figure 4, and no further air will be exhausted from the motor chamber 134. Any slight tendency for the motor head 74 to overrun such position will result in the "cracking" of the valve 108 relative to the valve seat 116 to admit sufficient air to the motor chamber 134 to arrest further movement of the motor head 74.

When the point of power run-out of the motor is reached, that is, the point at which maximum exhaustion of air from the chamber 134 has taken place, the motor can exert no further force tending to operate the power lever 45. As this point is approached, the pin 29 approaches the right-hand limit of the slot 60 (Figure 2), after which the pedal lever and power lever will move as a unit. Beyond the point of power run-out, therefore, additional application of the brakes is dependent upon the operator's ability to exert force against the brake pedal.

When the pedal is released, the spring 36 overcomes the compression of the spring 120, assisted somewhat by the spring 122 in the initial stages in the return movements of the parts, and the sleeve 115 will return to its normal position. As such position is approached (Figure 4), the lap position of the parts will be reached and the valve 108 will engage the seat 109. Movement of the sleeve 115 to its fully off position (Figure 1) again connects the chamber 134 to the atmosphere and the motor will be fully de-energized. As air is admitted to the motor chamber 134, the spring 138 will move the head 74 to its normal position and motion of this head will be arrested by engagement of the flange 95 with the cushion 86. The pin 93 at the upper end of the power lever 45 follows up relative to the piston rod as the motor is deenergized, the pin 93 remaining in the inner ends of the slots 91.

In the event of the failure of power in the motor, the brake pedal may be foot-operated without having to effect any movement of the motor head 74 or any of the parts connected thereto. Under such conditions, operation of the brake pedal will immediately move the pin 29 to the position shown in Figure 3. Thereafter, the two levers will move as a unit and the pin 93 will merely move freely in the slots 92 toward the free ends thereof. All of the parts of the motor will remain in their normal positions.

The bearing 81, having a spherical outer face, provides for rocking movement of the piston rod 142 about such spherical face, thus compensating for the slight movements of the pin 93 transversely of the slots 92.

As previously stated, the valve mechanism for the motor is particularly efficient and requires very little force for its operation. Being of the poppet valve type, no leakage will occur around the valve 108 past the seat 109 or 116 with which it is engaged, depending upon whether the motor is energized or de-energized. Three springs are employed for determining the positions of the valve parts in accordance with the position of the pedal lever 25, which constitutes the manual operating means for the motor. The spring 120 need be only slightly stronger than necessary to effect movement of the sleeve 115 and the movement of the sleeve portion 106 of the valve. The spring 122 need be only slightly stronger than necessary to insure the positive returning of the valve 108 to its normal position when the brake pedal is released. The spring 36 (Figure 1) can be made of relatively low tension so long as its loading is sufficient to exceed the force of the spring 120. Thus a soft initial brake operation is provided, there being no appreciable reaction against the brake pedal until the motor is energized to transmit force to the pin 58 to operate the master cylinder accompanied by the reaction force against the pin 51. Since this reaction force progressively increases during motor energization, the pedal reaction will proportionately progressively increase. The operator, however, is called upon to perform no appreciable work until motor energization actually takes place.

The parts of the motor are relatively simple, the head 74, sleeve member 105, and piston rod 79, as well as the sleeve 115 and valve body 106, preferably being formed of die castings. The assembling of the device also is quite simple, and the construction is such as to provide rapid motor response to any movement of the brake pedal.

In the interest of simplicity of description, the elements 109 and 116 have been described as valve seats and the resilient member 108 as a valve. Actually, the member 116 properly can be considered to be a valve, while the radially inner portion of the element 108 can be considered a seat for the valve 116 with the radially outer portion of the element 108 constituting a valve engaging with the seat 109. When so construed, the two springs 120 and 122 act on the two valves. The apparatus has been so defined in certain of the claims.

It is to be understood that the form of the invention shown and described is to be taken as a preferred example of the same and that various changes in the shape, size, and arrangement of the parts may be made as do not depart from the spirit of the invention or the scope of the appended claims.

I claim:
1. A fluid pressure motor comprising a stationary head, a movable head and a bellows connecting said heads and forming therewith a motor chamber, a piston rod connected to said movable head, a vacuum chamber in said movable head connected to a source of vacuum, a control chamber in said movable head communicating with said motor chamber, a valve seat formed in said movable head between said vacuum and control chambers, a valve normally engaging said seat, a first spring biasing said valve toward said seat, a second valve seat in said control chamber having its interior communicating with the atmosphere, said second valve seat normally being out of contact with said valve whereby said control chamber communicates with the atmosphere, a second spring stronger than said first spring biasing said second valve seat toward said valve to engage said valve and lift it from said first valve seat to disconnect said control chamber from the atmosphere and connect it to said vacuum chamber, and a manually controllable third spring connected to transmit a force to said second valve seat, said third spring being stronger than said second spring to normally hold said second valve seat out of contact with said valve.

2. A motor according to claim 1 provided with an actuating element engaging at one end with said second valve seat and having its other end projecting externally of the motor, said third spring being connected to transmit a force through said actuating element to said second valve seat to normally overcome said second spring.

3. A motor according to claim 1 wherein said piston rod projects through said movable head in sealed relation therewith, said actuating element comprising an actuating rod projecting axially through said piston rod, one end of said actuating rod engaging said second valve seat and the other end of such rod projecting beyond the other end of said piston rod, said third spring being connected to transmit a force to said other end of said actuating rod.

4. A motor according to claim 1 wherein said piston rod projects through said movable head in sealed relation therewith, said actuating element comprising an actuating rod projecting axially through said piston rod, one end of said actuating rod engaging said second valve seat and the other end of such rod projecting beyond the other end of said piston rod, and a pivoted member having a portion arranged in abutting engagement with and movable away from said other end of said rod, said third spring being connected to said pivoted member.

5. A fluid pressure motor comprising a stationary wall and a pressure movable wall, a piston rod carried by said movable wall, a valve mechanism comprising a plurality of elements, two of which are movable relative to each other and to said movable wall and normally occupying positions balancing pressures on opposite sides of said movable wall and movable to unbalance such pressures and move said movable wall, one of said elements comprising a movable member having a normal position in which pressures are balanced on opposite sides of said movable wall and movable to an operative position in which pressures are unbalanced on opposite sides of said movable wall, a first means biasing said member to said operative position, actuating means for said movable member comprising an actuating rod projecting axially through said piston rod and having one end connected to transmit force to said movable member to move the latter out of its operative position, the other end of said rod projecting externally of said motor, and a second biasing means stronger than said first biasing means connected to normally transmit a force to said other end of said actuating rod to maintain said movable member in its normal position.

6. A fluid pressure motor comprising a stationary wall and a pressure movable wall, a piston rod carried by said movable wall, a valve mechanism comprising a plurality of elements, two of which are movable relative to each other and to said movable wall and normally occupying positions balancing pressures on opposite sides of said movable wall and movable to unbalance such pressures and move said movable wall, one of said elements comprising a movable member having a normal position in which pressures are balanced on opposite sides of said movable wall and movable to an operative position in which pressures are unbalanced on opposite sides of said movable wall, a first means biasing said member to said operative position, actuating means for said movable member comprising an actuating rod projecting axially through said piston rod and having one end connected to transmit force to said movable member to move the latter out of its operative position, the other end of said rod projecting externally of said motor, said actuating means further comprising an actuating member in abutting engagement with said other end of said rod, and a second biasing means stronger than said first biasing means connected to said actuating member whereby, when said actuating member is moved against said second biasing means, said actuating rod is freed of the force of said second biasing means and said first biasing means moves said movable member to its operative position.

7. A fluid pressure motor comprising a stationary head and a movable head spaced therefrom and forming therebetween a motor chamber, a piston rod fixed at one end to said movable head, and a valve mechanism comprising a plurality of elements, two of which are movable relative to each other and to said movable head and normally arranged to connect said motor chamber to the atmosphere and operative for connecting such chamber to a source of vacuum, one of said elements comprising a movable member normally occupying a position in which said motor chamber is connected to the atmosphere and movable to an operative position in which said motor chamber is disconnected from the atmosphere and connected to said source, a first biasing means urging said movable member to said operative position, an actuating rod projecting axially through said piston rod and having one end connected to transmit force to said movable member, the other end of said actuating rod projecting beyond said piston rod externally of the motor, and a second biasing means connected to normally transmit its force to said other end of said actuating rod to maintain said movable member in its normal position.

8. A motor according to claim 7 provided with a movable actuating member having a portion in abutting engagement with and movable from said other end of said actuating rod, said second biasing means being connected to transmit force to said other end of said actuating rod through said actuating member.

9. A fluid pressure motor comprising a movable head and a stationary head and forming therebetween a motor chamber, a piston rod connected to said movable head, a vacuum chamber in said movable head connected to a source of vacuum, valve means controlling communication between said vacuum chamber and said motor chamber and normally disconnecting said chambers, said valve means comprising a valve and a movable member movable relative to each other and to said movable head, said movable member having a normal position out of engagement with said valve and movable to an operative position in which it moves said valve to disconnect said motor chamber from the atmosphere and connect it to said vacuum chamber, a first biasing means urging said movable member to said operative position, an actuating rod engaging said movable member, a pivoted member having abutting relationship with said actuating rod externally of the motor, and a second biasing means connected to said pivoted member to transmit force through said rod to said movable member in opposition to said first biasing means to overcome the latter and hold said movable member in said normal position.

10. A fluid pressure motor comprising a stationary wall and a pressure movable wall, a piston rod carried by said movable wall, a valve mechanism comprising a pair of valves and valve seats therefor, said valves normally occupying positions balancing pressures on opposite sides of said movable wall and being movable to operative positions to unbalance such pressures and move said movable wall, a pair of springs each having mechanical connection with one of said valves said springs acting cooperatively whereby said valves are urged to said operative positions, and biasing means separate from said springs having mechanical connection with said valve mechanism and normally cooperating therewith whereby said valves remain in their normal positions and whereby, when said biasing means is overcome, said valves will move to said operative positions to unbalance pressures on opposite sides of said movable wall.

11. A motor according to claim 10 provided with actuating means having mechanical connection with said valve mechanism, said biasing means being connected to said actuating means.

12. A motor according to claim 10 provided with an actuating rod projecting axially through said piston rod and having one end mechanically engaging said valve mechanism, the other end of said rod projecting externally of said motor, and means comprising said biasing means connected to normally transmit a force to said other end of said actuating rod whereby, when said last-named means is operated to overcome said biasing means, said valves will move to operative positions to unbalance pressures on opposite sides of said movable wall.

13. A fluid pressure motor comprising a casing, a pressure responsive unit comprising a stationary wall forming with said casing a variable pressure chamber, and a piston rod carried by said movable wall, said pressure responsive unit being provided with three coaxial chambers one of which is a high pressure chamber connected to a source of high pressure, another of which is a low pressure chamber connected to a source of low pressure, and the third of which is a control chamber in fixed communication with said variable pressure chamber, a pair of valves cooperating to control communication of said high pressure and low pressure chambers with said control chamber and having operative positions connecting said control chamber to said low pressure chamber and disconnecting said control chamber from said high pressure chamber to unbalance pressures on opposite sides of said movable wall to effect movement thereof, said valves normally occupying inoperative positions connecting said control chamber to said high pressure chamber and disconnecting said control chamber from said low pressure chamber, a pair of springs having mechanical connection with said valves and acting cooperatively whereby said valves are urged to said operative positions, actuating means connected to said valve mechanism, and biasing means separate from said springs connected to said actuating means to transmit force therethrough to said valve mechanism so that said valves remain in said normal positions and whereby, when said biasing means is overcome, said valves will move to said operative positions to unbalance pressures on opposite sides of said movable wall.

14. A motor according to claim 13 wherein said actuating means comprises an actuating rod projecting axially through said piston rod and having mechanical connection at one end with said valve mechanism, the other end of said rod projecting externally of said motor, and means comprising said biasing means connected to normally transmit a force through said other end of said actuating rod to said valve mechanism whereby said valves remain in said normal positions.

15. A motor according to claim 13 wherein said actuating means comprises an actuating rod projecting axially through said piston rod and having mechanical connection at one end with said valve mechanism, the other end of said rod projecting externally of said motor, said actuating means further comprising an actuating member in abutting engagement with said other end of said rod, said biasing means being connected to said actuating member whereby, when said actuating member is moved against said biasing means, said valves will move to said operative positions.

References Cited in the file of this patent

UNITED STATES PATENTS

| | | |
|---|---|---|
| 1,687,047 | Trail | Oct. 9, 1928 |
| 1,765,760 | Duty et al. | June 24, 1930 |
| 1,846,017 | Albinson | Feb. 23, 1932 |
| 2,079,409 | Hunt | May 4, 1937 |
| 2,090,575 | DeMotte | Aug. 17, 1937 |
| 2,134,072 | Christensen | Oct. 25, 1938 |
| 2,292,703 | Lawler | Aug. 11, 1942 |
| 2,421,726 | Thomas | June 3, 1947 |
| 2,791,203 | Ayers | May 7, 1957 |